United States Patent [19]

Powell

[11] 4,430,561
[45] Feb. 7, 1984

[54] HUBODOMETER

[75] Inventor: Patrick L. Powell, Franklin Park, Ill.

[73] Assignee: Standard Car Truck Company, Chicago, Ill.

[21] Appl. No.: 335,159

[22] Filed: Dec. 28, 1981

[51] Int. Cl.$^3$ ............................................. G01C 22/00
[52] U.S. Cl. .................................... 235/95 B; 235/96
[58] Field of Search ............... 235/95 B, 96, 103, 1 D

[56] References Cited

U.S. PATENT DOCUMENTS

| | | | |
|---|---|---|---|
| 1,723,434 | 8/1929 | Nutt | 235/96 |
| 2,638,274 | 5/1953 | Engler | 235/95 B |
| 3,198,430 | 8/1965 | Hermann | 235/103 X |

Primary Examiner—Benjamin R. Fuller
Attorney, Agent, or Firm—Augustus G. Douvas

[57] ABSTRACT

A hubodometer having a casing supported solely by, and balanced on, its mounting bracket by a ring-like shock mount. Additionally, an odometer mechanism assembly is carried by, and balanced on, a drive-gear shaft located within the casing on the axis of rotation of the hubodometer. The casing is formed by two joined cup-like shells each having a circular flange integrally formed at a mouth of the shell and lying against the flange of the other shell to define an enclosed cavity. An elastic-like gasket is seated upon the joined flanges, and a rigid retainer ring is seated upon the gasket. The retainer ring is fitted tightly to a circular wall of the mounting bracket to nest the casing at least partially within a socket cavity defined by the mounting bracket. The elongated drive-gear shaft has its shaft extremities anchored to opposite bottoms of each casing shell. The generally balanced mounting of the casing solely on the shock mount, and the generally balanced mounting of the odometer mechanism assembly on a drive shaft that is supported at both ends, provide a durable and reliable hubodometer.

17 Claims, 13 Drawing Figures

HUBODOMETER

BACKGROUND OF THE INVENTION

Hubodometers are well known in the art. U.S. Pat. No. 2,638,274 discloses a hubodometer which is extensively used to measure and indicate the elasped mileage travelled by various vehicles.

When existing hubodometers are applied to the wheels of railroad, highway, and off-road vehicles, they are subjected to abusive shocks and vibrations that greatly impair the useful life of these devices and also the accuracy of their readings. The replacement of a defective and inaccurate hubodometer is an expensive and time-consuming task.

Present hubodometer designs fail prematurely, in large part, because the casing containing the odometer assembly is not shock mounted with a weight and force balanced design, and also because the odometer indicator is not similarly balanced on its drive shaft. Because both the casing (and its contained structure) and the odometer indicator are not balanced, the forces generated by shocks and vibrations set up destructive torques.

Additionally, in many designs the hubodometer is supported on a cantilevered element, such as a projecting drive shaft. In these designs, the weight on the cantilevered element generates unbalanced forces that greatly shorten the operating life of the hubodometer.

SUMMARY OF THE INVENTION

Accordingly, a principle object of the present invention is to improve the reliability, and thus the accuracy of hubodometers.

The foregoing object is attained in part by employing an annular shock mount as the sole means for supportively coupling a casing, which contains the odometer assembly, to a wheel mounted bracket. This shock mount comprises an elastic-like gasket contained within a rigid retainer ring which envelopes the gasket. The ring-like shock mount is tightly fitted between an inner socket wall of the bracket and a set of projecting and mating casing flanges. The casing and the weight of the contained odometer assembly, are generally weight balanced about the usually vertical plane of the shock mount. Accordingly, destructive torques which would tend to rotate the casing relative its mounting bracket are substantially reduced.

Similarly, the foregoing object is further attained in part by employing a drive-gear shaft located within the casing with both shaft ends being fixedly anchored to the casing, thus, eliminating a cantilevered drive element. The odometer assembly also includes a U-shaped frame that carries a driven-gear shaft which engages the drive-gear shaft at a right angle. The odometer assembly is pivotally carried on the drive-gear shaft, and it is generally weight balanced on this shaft to minimize further destructive torques.

Another object of the invention is to improve the manner in which the hubodometer casing seals the contained odometer assembly from tampering and also environmental elements.

This object is attained by fabricating the casing with two identical cup-like shells. Each of the shells has a circular flange integrally formed at a mouth of the shell and lying against the flange of the other shell to define an enclosed cavity. The ring-like shock mount is tightly seated upon the joined flanges to form an efficient hermetic seal. Additionally, the seal formed by the shock mount inserted within its mounting bracket prevents unauthorized tampering with the odometer assembly.

DETAILED DESCRIPTION OF THE DRAWINGS

In order that all of the structural features for attaining the objects of this invention may be readily understood, reference is made to the accompanying drawings in which.

DETAILED DESCRIPTION OF THE INVENTION

Figure 1:
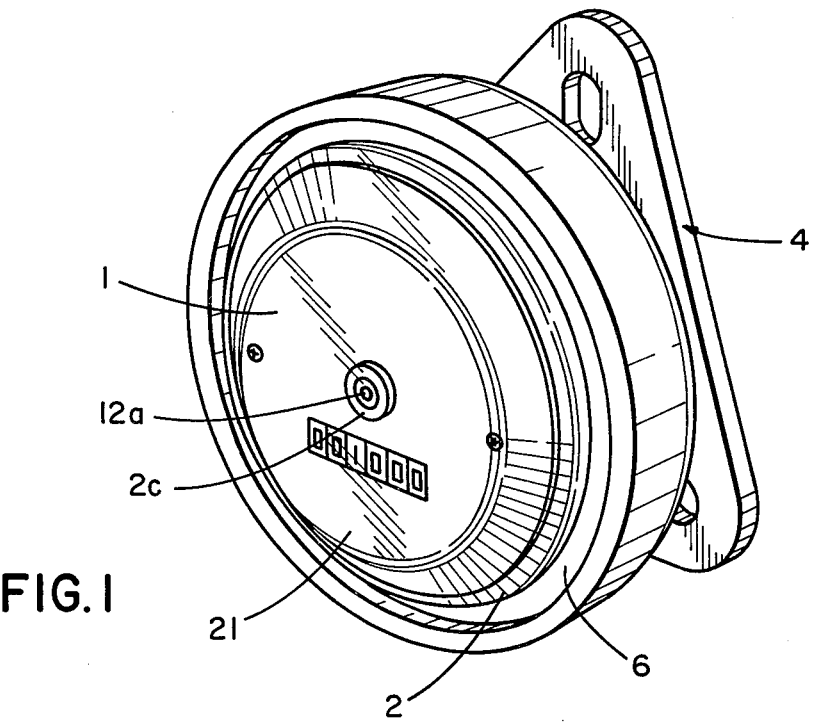
FIG. 1 is a perspective view of the hubodometer of this invention.
Figure 2:
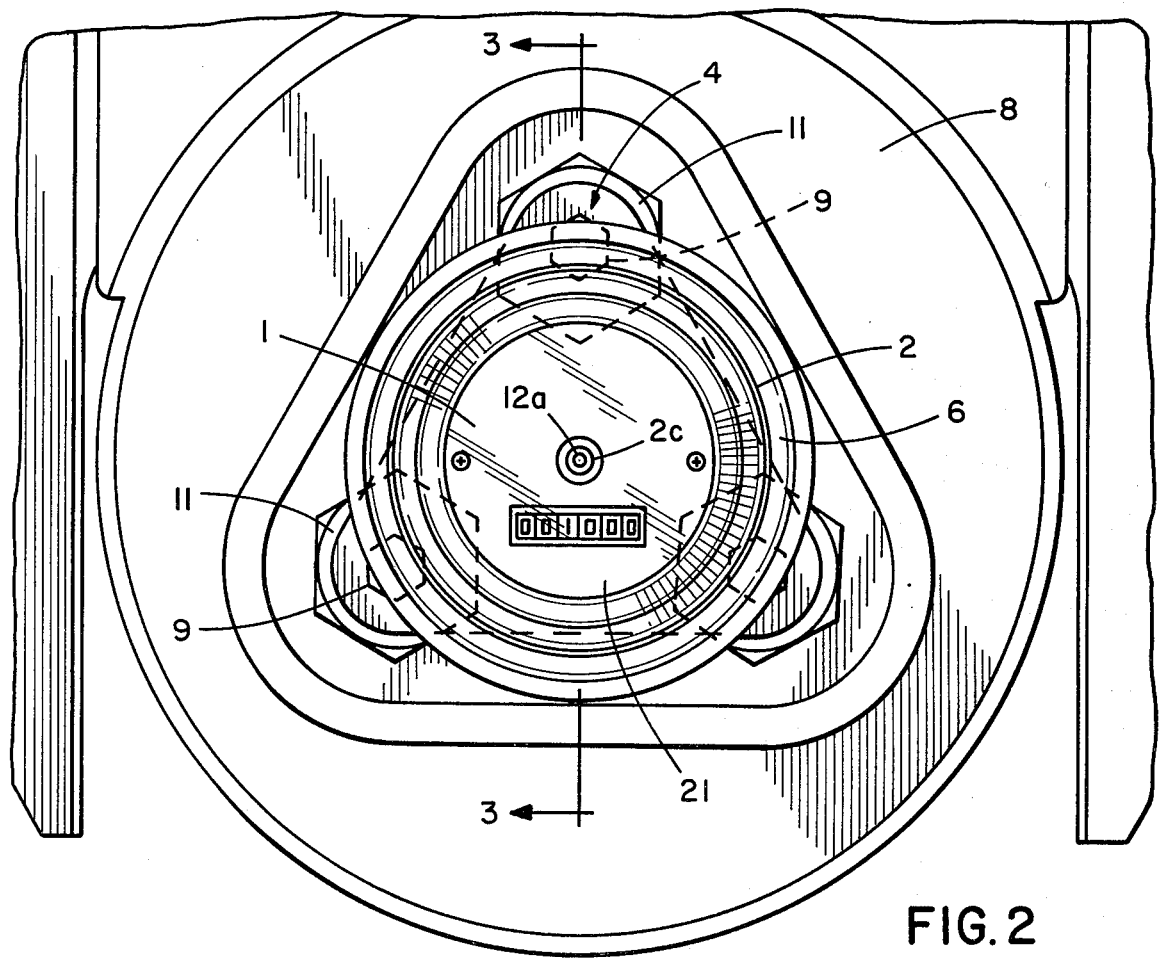
FIG. 2 is a front elevation view of the hubodometer fixed to a wheel hub.
Figure 3:
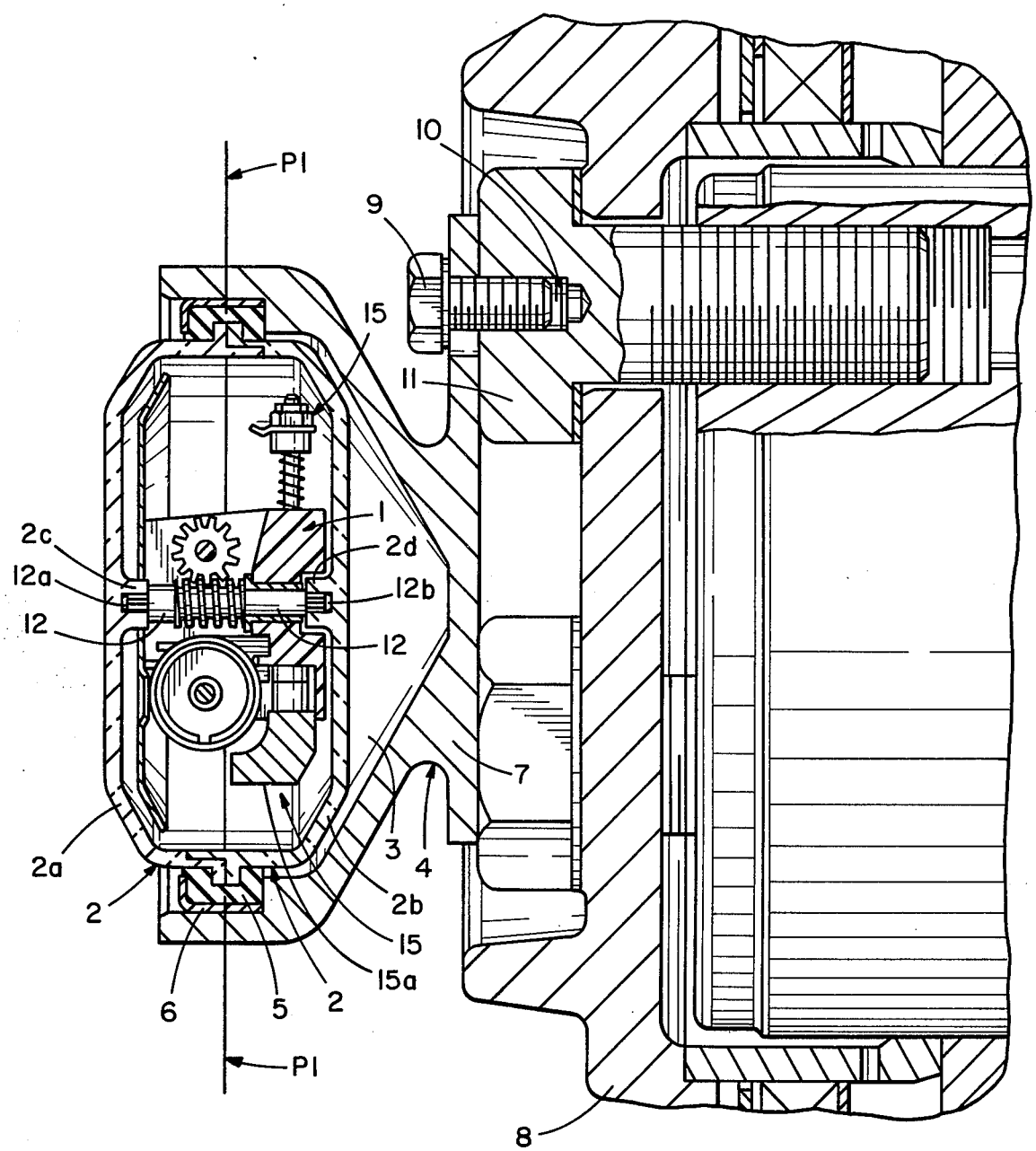
FIG. 3 is a section view taken along line 3—3 of FIG. 2 showing the details of the shock-mount structure for the encased odometer mechanism assembly; and also the engagement of the drive-gear shaft and the odometer-assembly, driven-gear shaft.

Referring to FIGS. 1, 2 and 3 of the drawings, odometer mechanism assembly 1 is housed within an enclosed cavity defined by plastic casing 2 (FIGS. 3, 8, 9, 10, 11). Casing 2 is in turn partially housed within a socket 3 defined by metallic mounting bracket 4. A toroidal shock mount, which includes Neoprene gasket 5 for metallic retainer ring 6 (FIG. 11) provides the sole support for casing 2 on mounting bracket 4.

Mounting bracket 4 has a generally triangular flanged base 7 which is typically secured to a wheel-cover plate 8 by a plurality of bolts 9 (FIG. 1). Each of bolts 9 engages a threaded bore 10 located within the head of an associated wheel-cover plate bolt 11.

The rotation of wheel-cover plate 8 produces a corresponding rotation in mounting bracket 4 and casing 2.

Figure 12:
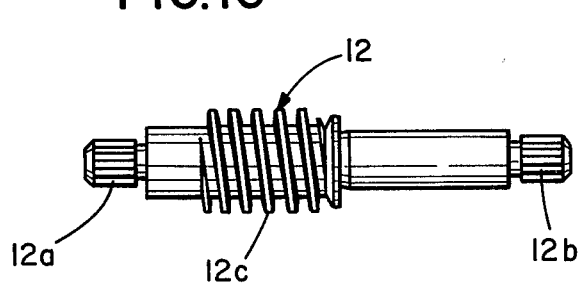
FIG. 12 is an elevation view of the drive-gear shaft.

Odometer mechanism assembly 1 is pivotally supported on drive-gear shaft 12 (FIG. 12). Drive-gear shaft 12 extends across the internal cavity defined by casing 2 in alignment with the axis of rotation of the composite wheel cover 8, mounting bracket 4, and the casing 2 subcombination (FIG. 3).

The knurled extremities 12a, 12b of shaft 12 are anchored to casing shells 2a, 2b (FIGS. 8, 9, 10) at central bearing bosses 2c, 2d (FIG. 3). Accordingly, drive-gear shaft 12 rotates when casing 2 rotates.

Figure 13:
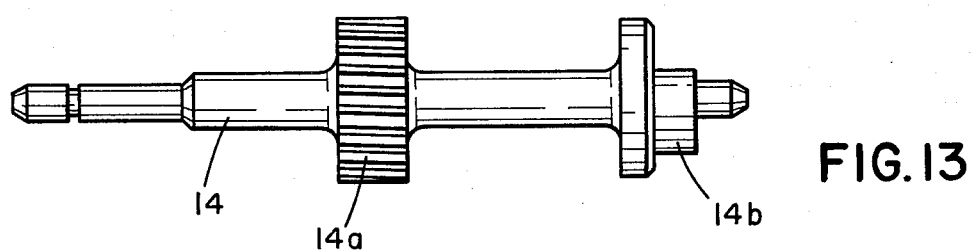
FIG. 13 is an elevation view of the odometer assembly driven-gear shaft.
Figure 11:
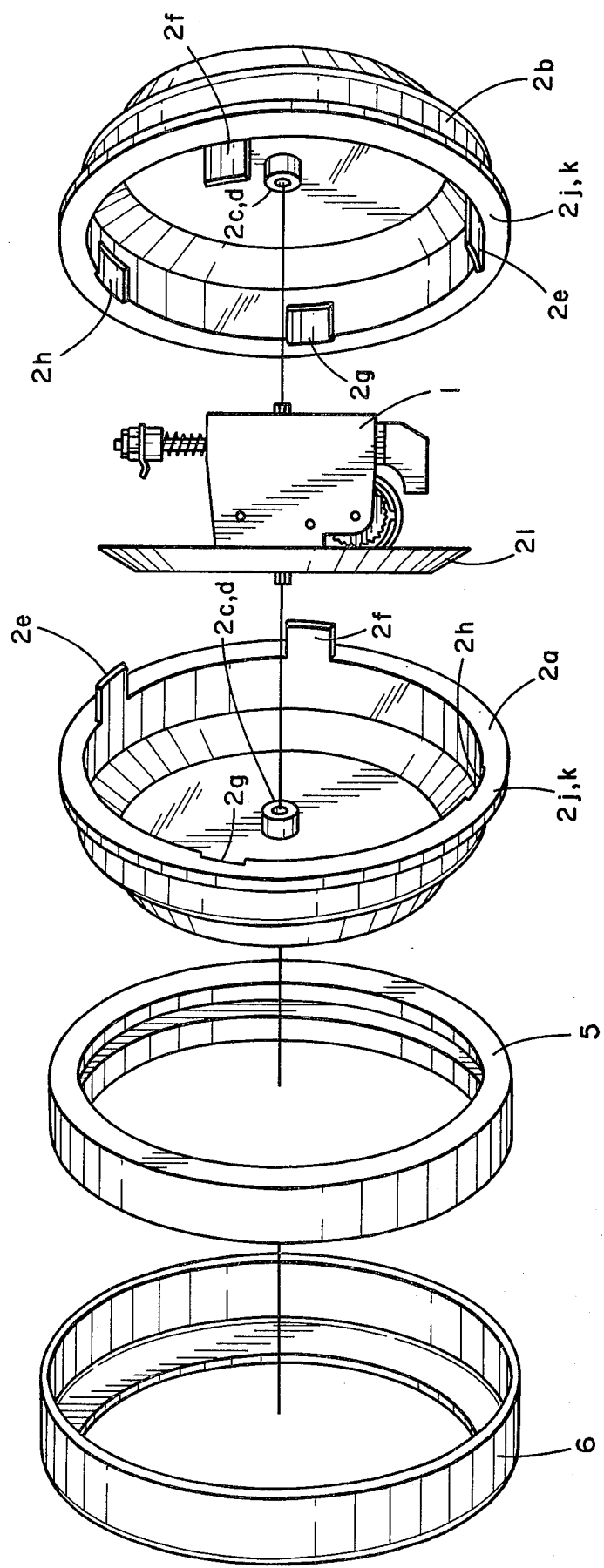
FIG. 11 is an exploded view, which is of assistance in understanding the assembly of the casing to enclose the odometer mechanism assembly, and thereafter the application of the shock-mount structure to the casing.

Odometer mechanism assembly 1 includes a U-shaped plastic frame 13 (FIGS. 4, 5) having a pair of spaced arms 13a, 13b joined by a base section 13c. Drive-shaft 12 extends loosely through base section 13c. Plastic driven-gear shaft 14 extends between frame arms 13a, 13b and is rotatably journalled in those arms. The center portion of shaft 14 (FIGS. 4, 13) is formed with an integral helical driven gear 14a which engages a drive worm gear 12c (FIG. 12) integrally formed on a central portion of drive shaft 12.

Odometer mechanism assembly 1 carries a conventional centrifugal weight assembly 15 which includes lead weight 15a. As is well known in the hubodometer art, the dynamic effect of weight 15a is to maintain frame 13 in a stable attitude when the attached wheel rotates. In particular, weight 15a is coupled to two elongated shafts 15b and 15c each housed within separate bores passing through base section 13c of frame 13 (FIGS. 3, 4, 5, 6, 7). Springs 15d and 15e envelop the elongated shafts 15b and 15c, respectively. Shaft tie plate 15f couples shafts 15b and 15c so that both shafts move in unison.

Figure 4:
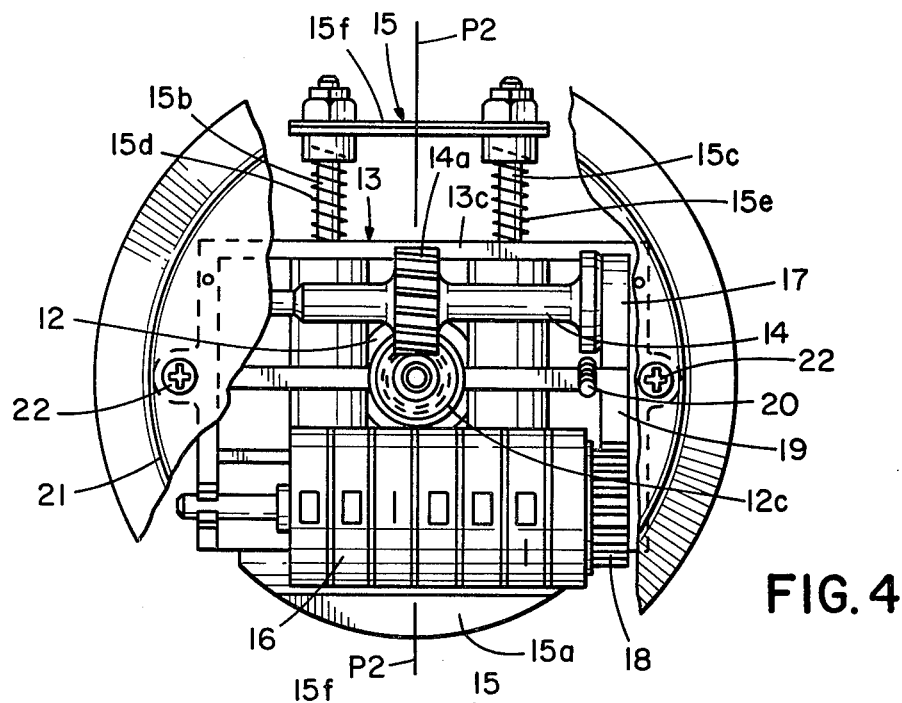
FIG. 4 is a front elevation view of the odometer mechanism assembly with a central portion of the face dial broken away.
Figure 5:
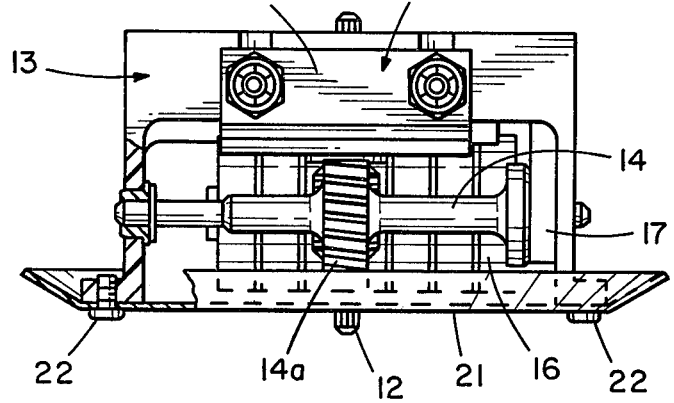
FIG. 5 is a plan view of the structure of FIG. 4.
Figure 6:
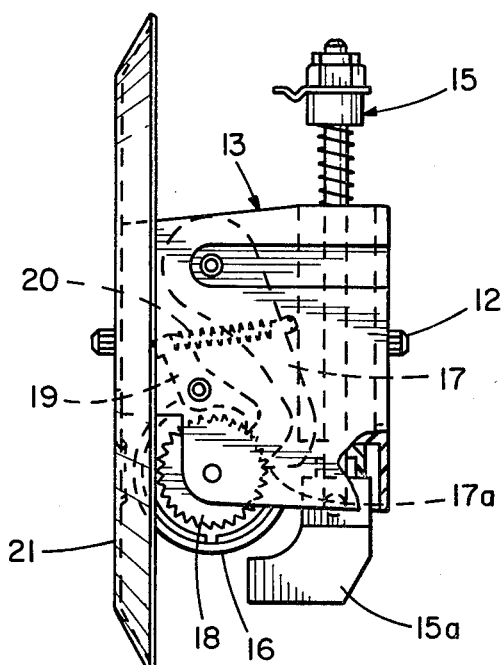
FIG. 6 is a right-side elevation view of the structure of FIG. 4.
Figure 7:
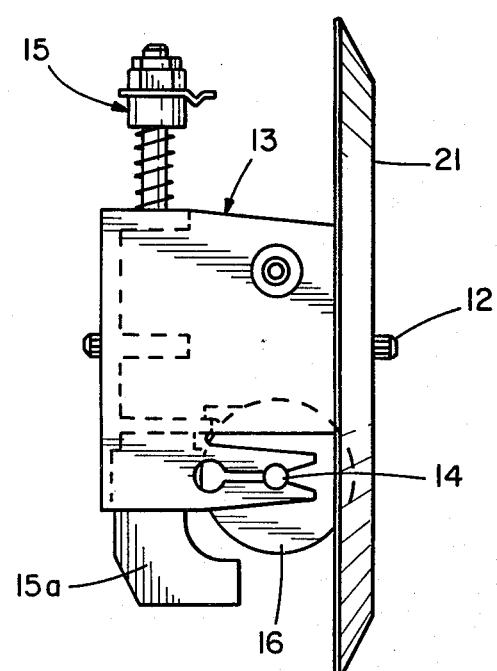
FIG. 7 is a left-side elevation view of the structure of FIG. 4.

Springs 15d and 15e are normally in an expanded, elongated condition (FIG. 4) which causes weight 15a to assume a retracted position relative frame 13. Weight 15a tends to maintain the odometer mechanism assembly 1, and therefore odometer register 16, at a stable attitude as is shown in FIG. 4. In the event, the hubodometer is subjected to impact or shock which would have the tendency to cause the odometer assembly mechanism to rotate, then weight 15a would compress springs 15d and 15e thereby enabling weight 15a to move away from the center of rotation of the hubodometer. This weight 15a movement counteracts, in a conventional way, any tendency for the hubodometer to rotate.

Rotation of flanged base 7 due to wheel rotation produces a corresponding rotation in casing 2 and its anchored drive-gear 12c. The rotation of drive-gear 12c, which is free of frame 13, drives driven-gear 14a which rotates driven-gear shaft 14. The longitudinal axis of shaft 14 is maintained at a generally horizontal attitude because frame 13, as weighted, is loosely carried on drive-gear shaft 12. Thus, driven-gear shaft 14 rotates responsively to wheel rotation, and this rotation is transmitted to conventional odometer 16 of odometer mechanism assembly 1. The six odometer wheels of odometer register 16 carry numerical indicia which may be calibrated to give a readout in number of wheel rotations, distance travelled, etc.

Drive pawl 17 (FIGS. 3, 6) is carried on eccentric shaft portion 14b (FIG. 13) of driven-gear shaft 14. Pawl tooth 17a engages odometer-register drive gear 18 to drive odometer register 16 in a conventional manner. Conventional indexing rachet 10 is coupled to pawl 17 by spring 20. Rachet tooth 19a also engages odometer register drive gear 18 to assure that the odometer register drive gear 18 is actuated only a single odometer-register drive-gear tooth for each revolution of driven-gear shaft 14.

Face dial 21 is secured to frame 13 by a plurality of screws 22.

Figure 8:
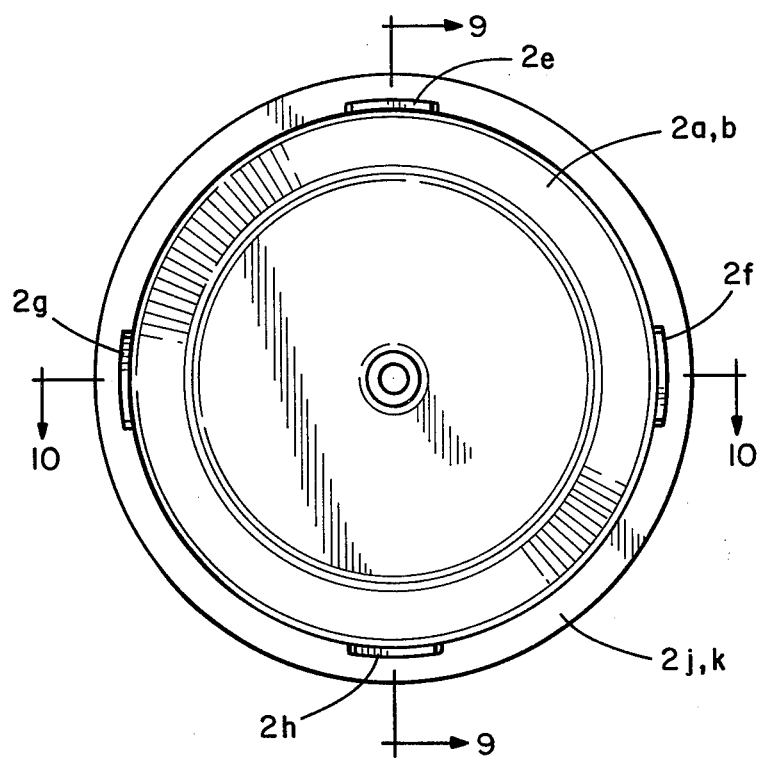
FIG. 8 is a front elevation view of one of the two identical cup-like shells comprising the casing for the odometer mechanism assembly.
Figure 9:
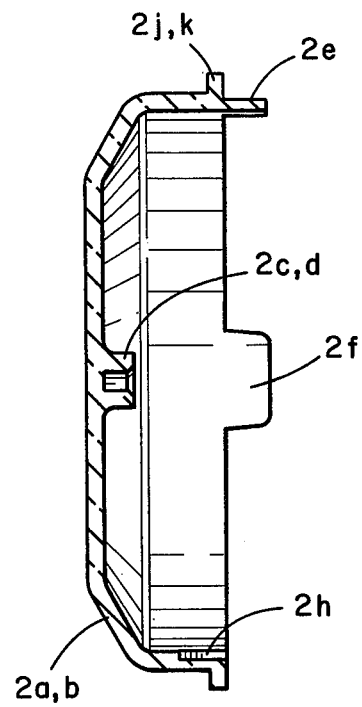
FIG. 9 is a section view taken along line 9—9 of the casing shell of FIG. 8.
Figure 10:
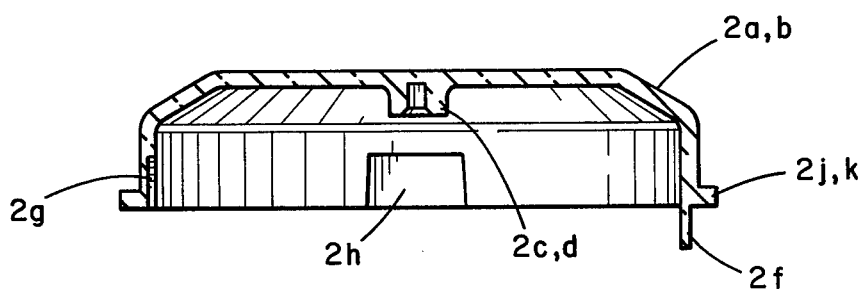
FIG. 10 is a section view taken along line 10—10 of the casing shell of FIG. 8.

Casing 2, which contains odometer mechanism assembly 1, is fabricated with two identical cup-like shells 2a,b (FIGS. 8, 9, 10). Each of the shells is fabricated with two projecting lugs 2e,f and two lug receiving recesses 2g,h. Additionally, a circular flange 2j,k is formed at the mouth-like rim of each shell.

When the two casing shells are mated by inserting the lugs 2e,f of one shell into the recesses 2g,h of the other shell (FIG. 3), the flanges 2j and 2k of both shells are in closed contact. The odometer mechanism assembly 1 contained within the internal cavity defined by both shells 2a,b is effectively sealed by seating Neoprene gasket 5 on the periphery of joined flanges 2j,k (FIG. 3). Thereafter, metallic retainer ring 6 is forcibly seated upon gasket 5. The encased odometer mechanism assembly 1 is engaged within socket 3 of mounting bracket 4 by forcibly nesting retainer ring 6 (and its engaged casing) within the bracket socket. In a commercial embodiment, the engagement effected by shock mount elements 5,6 is so secure that casing 2 can only be removed from bracket 4 by damaging the casing. Accordingly, undetected tampering with the hubodometer to effect an erroneous reading cannot be done.

The above described hubodometer structure provides for a substantial balancing of weight about (usually vertical) plane P1 of FIG. 3 and (usually vertical) plane P2 of FIG. 4. This balanced disposition of odometer mechanism 1 substantially eliminates destructive torques caused by shock and vibration forces. In particular, a shock caused by a hubodometer attached wheel passing over a bump, would tend to generate equal clockwise and counterclockwise torques about both planes P1 and P2 whose forces would cancel out. Accordingly, a hubodometer designed in accordance with the principles of this invention will not respond destructively to shock and vibration generated forces.

It should be understood, that the structural features described are merely illustrative of a preferred application of the principles of this invention. Structural modifications can be made without departing from the principles of the invention.

What is claimed is:

1. In a hubodometer having an odometer mechanism assembly contained within an enclosed casing supported by a mounting bracket adapted to be fixed to a rotating object, the improvement comprising a casing formed by two joined cup-like shells each having a circular flange integrally formed at a mouth of the shell and lying against the flange of the other shell to define an enclosed cavity, an elastic-like gasket seated upon the joined flanges, and a rigid retainer ring seated upon the gasket and fitted tightly to a circular wall of the mounting bracket to nest the casing at least partially within a socket cavity defined by the mounting bracket.

2. The combination of claim 1, comprising an elongated drive-gear shaft having each of its shaft extremities anchored to opposite bottoms of each casing shell with the longitudinal axis of the shaft being aligned on the axis of rotation of the hubodometer, and the drive-gear shaft pivotally carrying the odometer mechanism assembly.

3. The combination of claim 2, in which the odometer mechanism assembly includes a frame having a base portion through which the drive-gear shaft passes to carry the odometer mechanism assembly.

4. The combination of claim 3, in which the frame includes a pair of spaced arms joined by the base to form a generally U-shape, and an elongated odometer driven-gear shaft extending between and rotatably supported by the frame arms and engaging the driving-gear shaft to actuate the hubodometer.

5. In a hubodometer having an odometer mechanism assembly contained within an enclosed casing supported by a mounting bracket defining a cup-like socket adapted to be fixed to a rotating object, the improvement comprising a casing formed by two joined cup-like shells to define a cavity containing the odometer mechanism assembly, an elastic-like circular gasket seated upon the junction of the two shells, and a rigid retainer ring seated upon the gasket and fitted tightly to a circular wall of the mounting bracket socket to nest the casing at least partially within the socket defined by the mounting bracket with the casing being coupled to the mounting bracket solely by the gasket and the retainer ring.

6. The combination of claim 5, comprising an elongated drive-gear shaft having each of its shaft extremities anchored to opposite bottoms of the casing shells with the longitudinal axis of the shaft being aligned on the axis of rotation of the hubodometer, and the drive-gear shaft pivotally carrying the odometer mechanism assembly.

7. The combination of claim 6, in which the odometer mechanism assembly includes a frame having a base portion through which the drive-gear shaft passes to carry the odometer mechanism assembly.

8. The combination of claim 7, in which the frame includes a pair of spaced arms joined by the base to form a U-shape, and an elongated odometer driven-gear shaft extending between the frame arm and engaging the driving gear shaft to actuate the hubodometer.

9. In a hubodometer having an odometer mechanism assembly contained within an enclosed casing supported by a mounting bracket having a socket which receives the odometer mechanism assembly and its casing with the bracket being adapted to be fixed to a rotating object, the improvement comprising two cup-like shells each having a bottom and a sidewall defining an opening with both shells being joined at their openings to form the enclosed casing, an elongated drive-gear shaft having each of its shaft extremities anchored to the opposing shell bottoms of the casing with the longitudinal axis of the shaft being aligned on the axis of rotation of the hubodometer and the drive-gear shaft pivotally carrying the remaining portion of the odometer mechanism assembly contained within the casing, and an annular resilient shock mount seated upon the casing on the periphery of its joined openings and lodged between the casing and the mounting bracket and serving as the primary support of the casing on the bracket.

10. The combination of claim 9 in which the annular resilient shock mount serves as the sole support means contacting the casing and carried by the bracket.

11. In a hubodometer having an odometer mechanism assembly contained within an enclosed casing supported by a mounting bracket having a socket which receives the odometer mechanism assembly and its casing with the bracket being adapted to be fixed to a rotating object, the improvement comprising two cup-like shells each having a bottom and a sidewall defining an opening with both shells being joined at their openings to form the enclosed casing, and an annular resilient shock mount seated upon the casing on the periphery of its joined openings and lodged between the casing and the mounting bracket and serving as the primary support of the casing on the bracket.

12. The combination of claim 11 in which the annular resilient shock mount serves as the sole support means contacting the casing and carried by the bracket.

13. In a hubodometer having an odometer mechanism assembly contained within an enclosed casing supported by a mounting bracket having a socket which receives the odometer mechanism assembly and its casing with the bracket being adapted to be fixed to a rotating object, the improvement comprising two casing elements each having a bottom with both elements being joined to form the enclosed casing, an elongated odometer-mechanism-assembly support shaft having each of its shaft extremeties anchored to an opposing bottom of the casing with the longitudinal axis of the shaft being aligned on the axis of rotation of the hubodometer and the support shaft pivotally carrying the remaining portion of the odometer mechanism assembly contained within the casing, and an annular resilient shock mount seated upon the casing and lodged between the casing and the mounting bracket and serving as the primary support of the casing on the bracket and through which rotary motion of the bracket is communicated to the casing and its anchored odometer-mechanism-assembly support shaft.

14. The combination of claim 13 in which the annular resilient shock mount serves as the sole support means contacting the casing and carried by the bracket.

15. A hubodometer comprising an odometer mechanism assembly, an enclosed casing containing the odometer mechanism assembly, a mounting bracket having a socket which receives the odometer mechanism assembly and its casing with the bracket being adapted to be fixed to a rotating object, an elongated odometer-mechanism-assembly support shaft having each of its shaft extremeties anchored to the opposite side of the casing with the longitudinal axis of the shaft being aligned on the axis of rotation of the hubodometer and the odometer-mechanism-assembly support shaft being coupled to the remaining portion of the odometer mechanism assembly contained within the casing, and a resilient shock mount seated upon the casing and lodged between the casing and the mounting bracket and serving as the primary support of the casing on the bracket and through which rotary motion of the bracket is communicated to the casing and its anchored odometer-mechanism-assembly support shaft.

16. The combination of claim 15 in which the resilient shock mount serves as the sole support means contacting the casing and carried by the bracket.

17. The combination of claim 16 in which the resilient shock mount is aligned in a plane which is substantially normal to the longitudinal axis of the odometer mechanism-assembly-support shaft.

* * * * *